UNITED STATES PATENT OFFICE 2,409,190

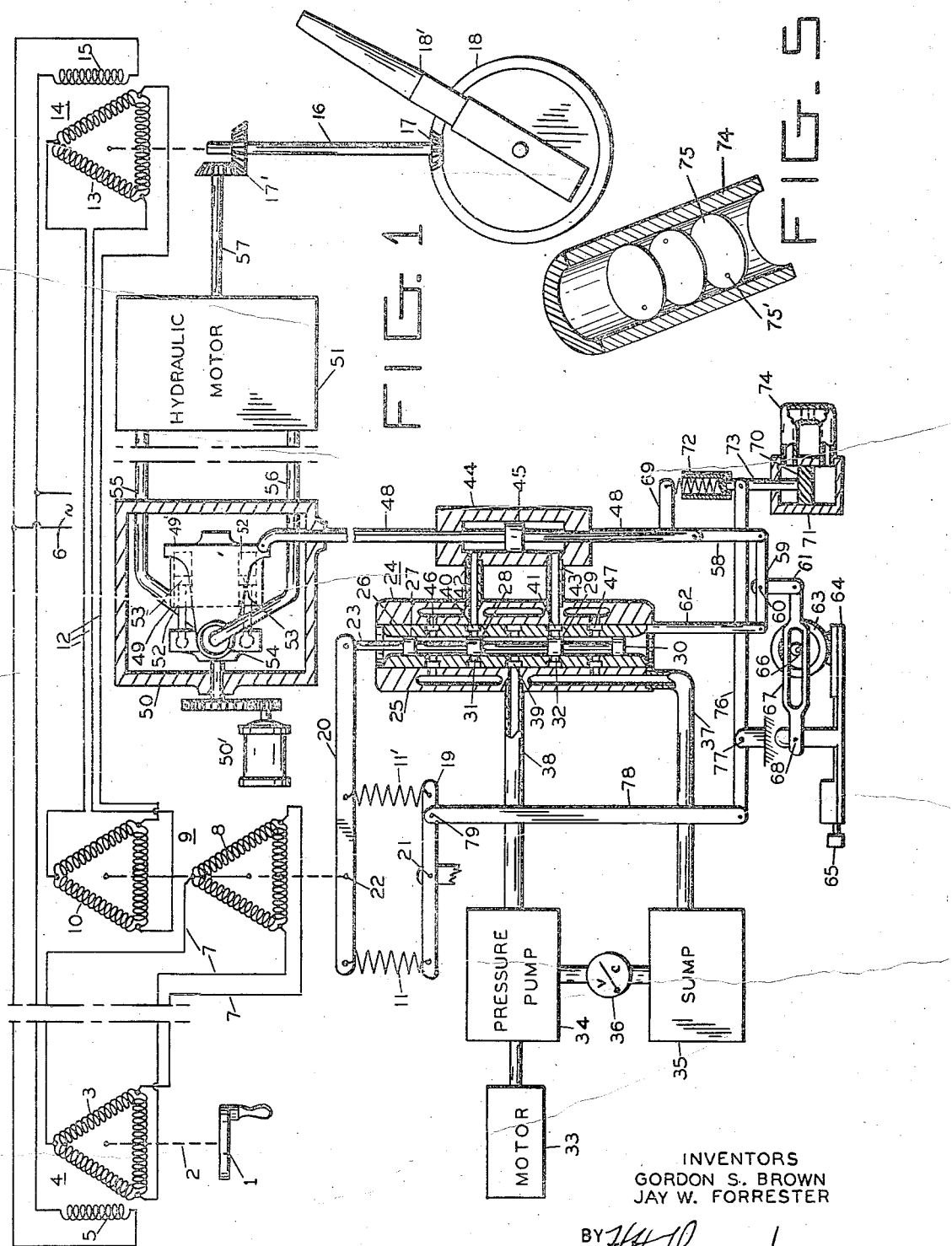

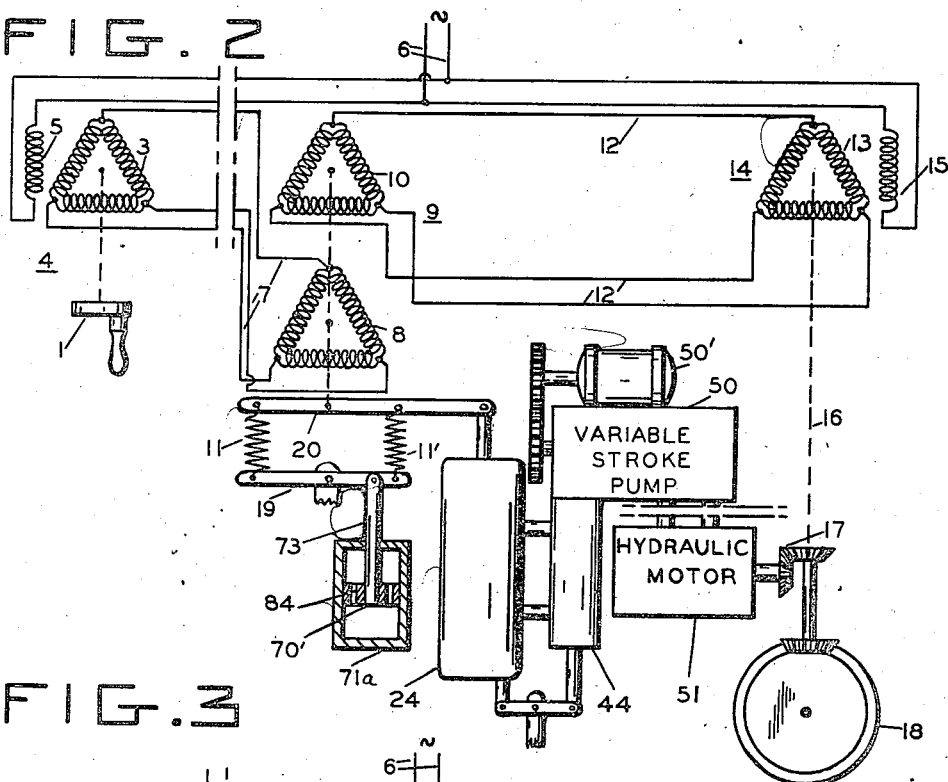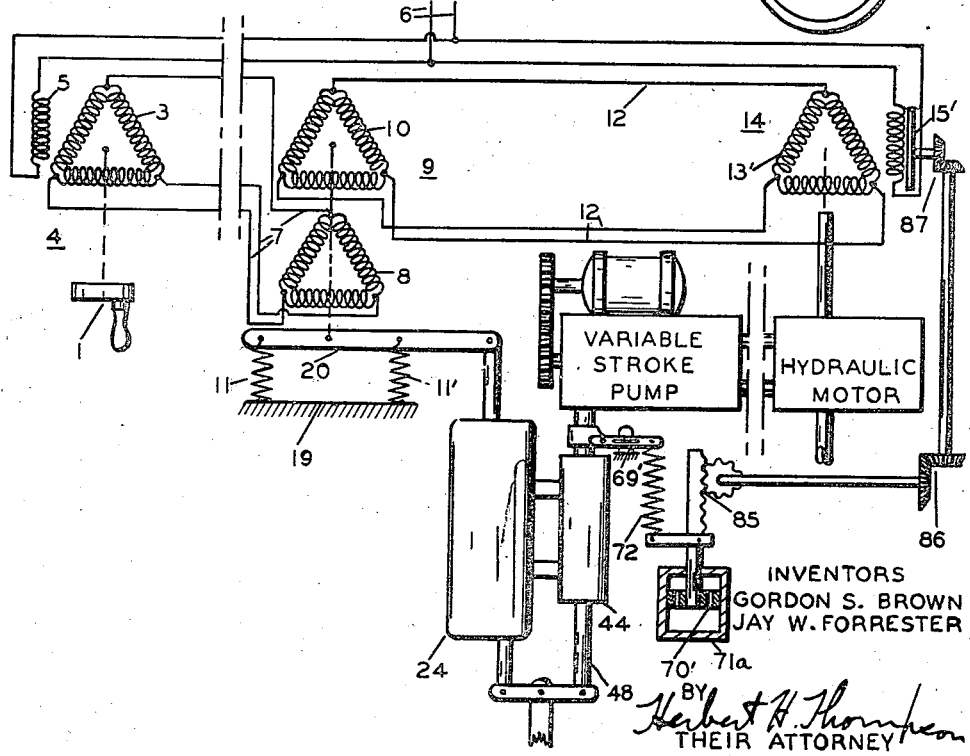

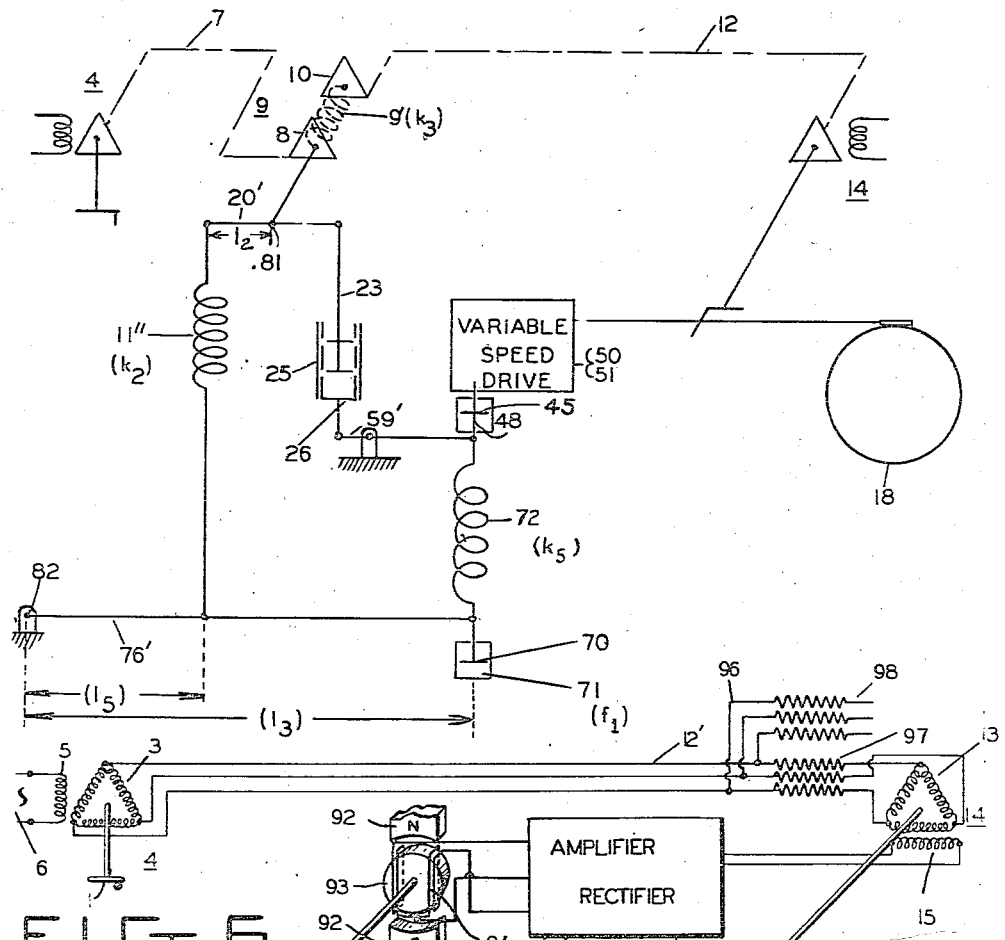
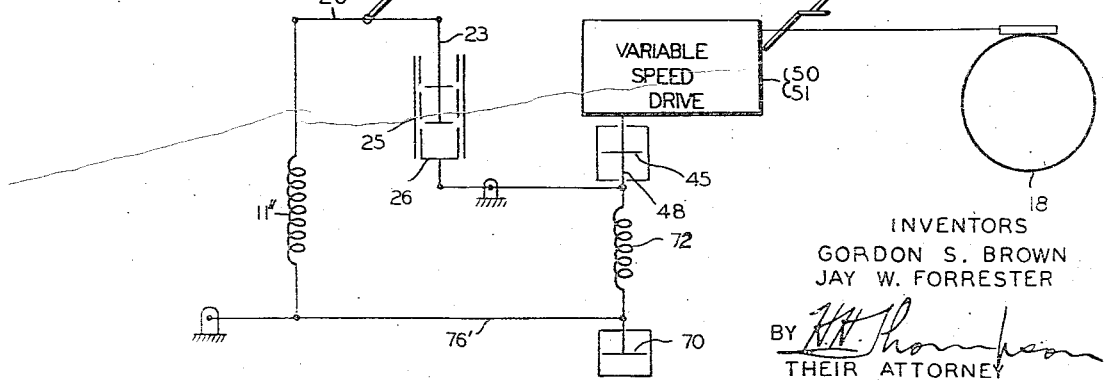

REMOTE CONTROL SYSTEM

Gordon S. Brown, Wellesley Hills, Mass., and Jay W. Forrester, Anselmo, Nebr., assignors, by mesne assignments, to Sperry Gyroscope Company, Inc., North Hempstead, N. Y., a corporation of New York Application September 20, 1941, Serial No. 411,670

10 Claims. (Cl. 60—53)

This invention relates to systems for remotely controlling positionable objects, especially objects having considerable inertia such as rotatably mounted searchlights, guns and the like, to cause the controlled object to move in correspondence with a controlling object, and it refers, more particularly, to systems of the above character in which means are provided to compensate for the normal tendency of the controlled object, when following at the speed of the controlling object, to lag behind the position of the latter object.

One of the difficulties encountered in attempting to provide a system, free from lag, for moving a heavy object in correspondence with a remote object is the tendency of such a system to become unstable as the error in following is reduced, with resulting hunting or oscillation of the controlled object. Various types of antihunting control have been proposed but these arrangements have been for the most part, inconsistent with the elimination of lag. The present invention, on the other hand, provides an inherently stable system to which complete error compensation or controllable under or over compensation may be applied without causing a tendency to hunt.

When the controlling and controlled objects are moving at the same constant velocity, in a system which employs a control term proportional only to positional disagreement as has heretofore been customary, the lag error may be taken to be proportional to this velocity if the effect of the operating condition of the system is disregarded. In this effect are included the results of lost motion, leaks in hydraulic transmission systems and resistance to motion of the controlled object. The effect of the operating condition of the system, however, in practice is not negligible and therefore to provide controllable compensation for lag according to the present invention, we make use of an auxiliary control term or signal, in addition to and in combination with the positional disagreement signal, which corresponds to a variable factor so proportioned as to eliminate lag due to all of the above-mentioned causes. The value of this correction signal, according to the invention, is preferably determined by the position of a member which controls the output of the driving motor or other means for moving the controlled object. This component of control, derived from the position of the motor controlling element, is usually referred to hereinafter as a velocity term or signal, since, for the type of driving means with which the present invention is principally concerned, the speed of velocity of the driving means and hence of the controlled object is primarily although not uniquely determined by the position or setting of the motor controlling element. To be able to use such a velocity signal or term to eliminate lag we provide first, as has been noted, a system which is stable, that is, one without hunting tendencies and second, means for producing a lag in the response of the controlled object to the velocity term as will be further pointed out.

Because of the means adopted, not only is it possible to control the amount of, or entirely eliminate, controlled object lag in our improved system, but it is further possible to cause the controlled object to follow at a constant velocity in a position in advance of the controlling object, that is, a lead of adjustable amount may be introduced. This is a feature particularly applicable to many types of gun positioning systems, for example, systems where the controlling object is a telescope or sight by means of which a moving target is tracked and it is required that the gun be advanced ahead of the position of the sight to compensate for target movement during the time of flight of the projectile or to introduce other corrections needed in such systems.

In addition to eliminating positional disagreement or lag as a function of the velocity of the controlled object, it is possible by the control means of the improved system to eliminate positional disagreement or lag due to variations in torque which the controlled object may impose on its driving means. That such a lag can exist even under zero-velocity conditions is evident from the fact that the driving motor may required the maintenance of a certain rate of supply of motivating medium merely to hold the controlled object in the desired position against a counter torque or load. This torque-correction feature, like the elimination of velocity lag, is important in gun positioning systems, where it is necessary to hold the gun trained on the target under varying conditions, such as where the gun is exposed to a heavy cross wind, or where the gun base is not horizontal, so that a non-uniform load may be imposed on the gun driving means.

In the embodiments of the invention illustrated in the drawings, certain elements are shown in electrical, mechanical and hydraulic form and are so described. It will be apparent to those skilled in the art however, that a wide choice is presented as to the elements which can be used to perform the described functions and that systems within the scope of the invention may utilize equivalents of widely different types.

One object of the invention is to provide an error-free remote control system for objects possessing substantial inertia.

Another object is to provide an inherently stable system for causing a controlled object to follow the motion of a remote controlling object and one which may be made error-free without thereby becoming subject to oscillation or hunting.

Another object is to provide a system of the above character in which the driving means for the controlled object is actuated jointly in accordance with the positional disagreement of the controlling and controlled objects and in accordance with the position or setting of the speed control for said means.

A further object is to provide a system of the above character in which the actuation of the controlled object driving means in accordance with said control setting is controllably delayed to adjust the relative phase of the positional and speed control terms.

Another object is to provide a control system which permits driving the controlled object selectively in positional agreement with or lagging or leading the controlling object by an adjustable amount.

Another object is to provide a control system in which the controlled object position is maintained in synchronism with or leading or lagging the controlling object position by an adjustable amount for any torque exerted upon the controlled object, whether such torque be great or small.

Still another object is to provide a system of the above character in which a plurality of controlled objects may be positioned by a single controlling object substantially without reaction one upon the other or upon the controlling object.

Other objects and advantages of this invention will become apparent as the description proceeds.

In the drawings:

Fig. 1 is a diagram of a control system in accordance with our invention in which certain members are shown in section.

Figs. 2 and 3 are diagrams illustrating modifications of the system of Fig. 1.

Fig. 4 is a schematic diagram for purposes of explanation.

Fig. 5 is an enlarged sectional view of a lag controlling device.

Fig. 6 is a schematic diagram showing a modification in the electrical positional control system.

In Fig. 1, reference numeral 1 is applied to a controlling object whose motion is to be reproduced at a remote point, which object is here illustrated simply as a handwheel but may be a tracking telescope or other movable member. Controlling object 1 rotates shaft 2 which mounts the three-winding rotor 3 of "Selsyn" transmitter 4 having a stator winding 5 excited from an alternating current source 6. The windings of rotor 3 are connected by three conductor transmission line 7 to similar windings of the movable or rotor member 8 of electrical differential 9 also having a similarly wound stator member 10. The windings of stator 10 are connected by three conductor transmission line 12 to the windings of rotor 13 of "Selsyn" receiver 14 having a stator 15 excited from source 6. Rotor 13 is mounted on shaft 16 connected by gearing 17 to the controlled object, here illustrated as rotatable platform 18 mounting gun 18'. It will be obvious that any other heavy object may be similarly arranged for controlled movement.

"Selsyn" transmitter 4 and receiver 14 are similar to instruments commonly used in position reproducing systems but are here used to generate electrical signals proportional to the relative position of their respective rotors. Electrical differentials, such as differential 9, having a construction similar to "Selsyn" instruments are well known in the art and need not be described here. In the operation of such devices the rotor tends to align the magnetic axis of its field with that of the magnetic axis of the field of the stator and in consequence is adapted to exert a torque proportional to any misalignment of the directions of the two fields, which in the present system represent the positions of the controlling and controlled objects respectively, by virtue of the signals generated by "Selsyns" 4 and 14. Rotation of rotor 8 is opposed by a counter torque applied by springs 11 and 11' about pivot point 22 as will now be described.

Springs 11 and 11' resiliently connect levers 19 and 20. Lever 19 is pivoted to datum at 21 while lever 20 is connected to and rotates with differential rotor 8 about pivot point 22. Springs 11 and 11' being on opposite sides of the pivot point are adapted to oppose rotation of lever 20 in either direction and thereby to supply a torque to balance any torque developed magnetically between rotor 8 and stator 10. Lever 20 is pivotally connected at one end to piston rod 23 of pilot valve 24 whose displacement furnishes the input to a hydraulic amplifying system. Valve 24 comprises a housing 25 having a cylindrical bore in which sleeve 26 is slidable, and within the sleeve a piston assembly, comprising pistons 27, 28, 29 and 30 formed on rod 23, is slidable. Pistons 28 and 29 cooperate with and govern the effective openings of ports 31 and 32, respectively, in sleeve 26 while pistons 27 and 30 close the bore of sleeve 26 to prevent loss of fluid.

A motor 33 drives pressure pump 34 which supplies fluid, preferably oil, from sump 35 through check valve 36 to valve 24 by way of intake pipe 38, the return fluid flow from the valve to the sump being by way of tail pipe 37.

Pipe 38 communicates by way of port 39 in sleeve 26 with the bore of sleeve 26 to supply fluid which normally exerts equal pressure in opposite directions on pistons 28 and 29. In their equilibrium positions these pistons completely cover and slightly overlap ports 31 and 32 in sleeve 26, respectively, which communicate with annular grooves 40 and 41 on sleeve 26, respectively, which in turn communicate with pressure pipes 42 and 43, respectively, conecting with cylinder 44 on opposite sides of piston 45. The return fluid from the valve and cylinder finds its way back to tail pipe 37 by way of ports 46 and 47, communicating with annular passage-ways in housing 25 leading to the tail pipe.

Piston 45 is mounted on piston rod 48 and the motion of this piston, communicated by rod 48, tilts cylinder block 49 of multi-cylinder, variable stroke pump 50 through yoke 49' which mounts the outer bearing in which the block turns. Pump 50 forms one unit of a variable speed hydraulic drive in which the pump operates hydraulic motor 51 at a speed dependent on the stroke of its pistons which in turn is proportional to the angle of tilt of the cylinder block. This combination of pump and motor is well known in the art under the name of the "Vickers"

variable speed drive and will not be described in detail. Cylinder block 49 of the pump, constantly driven by motor 50' and housing cylinders 52 in which pistons 53 slide when the block is rotated about an axis at an angle with the shaft of driving motor 50', is pivoted by yoke 49' about hollow trunnions 54 and is angularly adjustable about said trunnions in accordance with the position of piston rod 48. Fluid displaced by the pump pistons is circulated to hydraulic motor 51 by way of trunnions 54 through lines 55 and 56 and motor 51 is connected to drive platform 18 by way of shaft 57 and shaft 16 connected to shaft 57 by gearing 17'.

Piston rod 48 extends through cylinder 44 at both ends and at the lower end is articulated through link 58 to rotate lever 59, pivoted at 60 to arm 61, through a pivot connection at the right end of the lever. At its left end lever 59 is pivotally connected to valve sleeve operating rod 62 which axially displaces sleeve 26 within housing 25 to effect a change of registry between ports 31 and 32 in said sleeve and pistons 28 and 29 on rod 23.

Arm 61 is not fixed to datum but is given a small longitudinal oscillation by "dither" motor 63 slidably mounted on base 64 and adjustable along this base by means of adjustment screw 65. Motor 63 mounts on its shaft an eccentric 66 which cooperates with slotted link 67, pivoted to datum at 68, to oscillate arm 61, the amplitude of this oscillation or dither being determined by the position of eccentric 66 relative to pivot 68. The oscillation imparted to arm 61 is transmitted to sleeve 26 through lever 59 and rod 62, piston 45 being substantially held against direct oscillation by fluid pressure.

The dither introduced by motor 63 preferably has a frequency in the neighborhood of about 30 to 60 cycles per second and an amplitude of a few thousandths of an inch. With dither eccentric 66 stationary, pistons 28 and 29 normally overlap ports 31 and 32, respectively, by a few thousandths of an inch. The actual magnitude of the dither should be such that sleeve 26 oscillates along its axis by an amount slightly greater than the port overlap so that ports 31 and 32 in sleeve 26 are opened at each extremity of the oscillation just sufficiently to admit fluid cyclically to the piston 45 in quantities suitable to dither piston 45. The purpose of this dither feature is to break seizures of relatively movable contacting surfaces due to static friction and to remove dead zones in the system from valve piston rod 23 as far back as the output shaft 16 of the hydraulic transmission. In other words, sufficient tremor is imparted to piston 45 to impart some (although a lesser) tremor to pump 52 and also to transmit sufficient tremor through to motor 51 to take up any lost motion in gearing 17 and 17', in addition to overcoming static friction throughout the system. Therefore by imparting the correct amount of tremor to the system, we materially improve its response characteristics, and eliminate errors due to lost motion.

Piston rod 48 at its lower end mounts a bracket 69 connected by spring 72 and piston rod 73 to piston 70 moving in dash-pot 71, spring 72 being of a type adapted to sustain either tension or compression. Dash-pot 71 is filled with viscous fluid which is pumped back and forth between the opposite ends through a conduit 74 having a restriction to introduce a friction factor and thereby regulate the speed of response of the motion of the system 70, 72, 73 to a displacement of bracket 69. A preferred construction of said restriction is shown in Fig. 5 which illustrates the use of a plurality of spaced thin discs 75 each closing conduit 74 except for a small orifice 75'. The several orifices 75' are in staggered relation so that the damping fluid is forced by a tortuous path through the conduit and passes through a multiplicity of orifices. As an example of the dimensions of a practical device, ⅜" diameter discs .002" thick have been used having orifices .035" in diameter. Thin-edged orifices of this type allow orifice flow which is substantially independent of temperature. The friction introduced by such an arrangement is variable by varying the number of discs, the size of the orifices and to some extent the staggering and spacing. Means are thus provided for introducing a friction factor of predetermined magnitude.

Piston rod 73 is pivotally connected to one end of lever 76, rotatable about adjustable pivot point 77, and the opposite end of lever 76 is pivotally connected to one end of arm 78, which in turn is pivotally connected at its other end to lever 19 at pivot point 79.

In operation, angular displacement of handwheel 1, by creating a disagreement between the positions of "selsyn" rotors 3 and 13 at the two ends of the system, relatively displaces the directions of the resultant fields of rotor 8 and stator 10 of "selsyn" differential 9 and thereby causes rotor 8 to exert a torque tending to tilt lever 20 about pivot point 22. This torque is resisted by the counter-torque exerted by springs 11 and 11' about pivot point 22, the result being a limited rotation of lever 20, the magnitude of which is determined by the ratio of the spring torque (i. e., the strength of the springs times their lever arm) to the torque exerted by electrical differential 9. Rotation of lever 20 moves piston rod 23 and displaces pistons 28 and 29 to uncover ports 31 and 32, respectively, and thereby differentially change the fluid pressure on opposite sides of piston 45, causing said piston to move within cylinder 44 and, through piston rod 48, change the angle of tilt of cylinder block 49. The resulting change in operating speed of hydraulic motor 51 is in a sense which tends to restore the positional agreement between the controlling and controlled objects and hence to wipe out the signal generated by the positional disagreement between rotors 3 and 13.

The motion of piston 45, transmitted by rod 48, link 58, lever 59 and rod 62 to sleeve 26, so positions the sleeve that ports 31 and 32 are returned to their normal relationship with respect to pistons 28 and 29. The connection between piston 45 and sleeve 26 therefore constitutes the repeat-back which wipes out the input to the hydraulic amplifying system applied by way of rod 23.

At the same time that the motion of piston 45 is transmitted to sleeve 26 it changes the extension of spring 72 and thereby exerts a torque on lever 76 about pivot point 77 which, if unopposed would cause link 78 to exert a corresponding torque on lever 19 about pivot point 21. However, dash-pot 71 being filled with viscous fluid which, to allow movement of piston 70, must be pumped through orifices 75' in conduit 74, movement of piston 70 is initially retarded and is completed only after a certain adjustable time interval. Change of displacement of piston 45 is thus transmitted after a delay to lever 19, where, by the coupling of springs 11 and 11', the resulting torque is effectively combined with the torque exerted by rotor 8 on lever 20. Since displacement of piston 45 is proportional to the angle of tilt of cylinder block 49 and hence, for a given operating condition, to the speed at which hydraulic motor 51 drives platform 18, the system comprises means for combining with a signal proportional to the positional disagreement of a controlling and a controlled object a signal primarily proportional to the velocity of the controlled object, the combination occurring in an adjustable phase relationship. The sense in which the two component signals are combined is significant. The so-called velocity term as defined herein is here applied in a regenerative sense which causes it to take over, wholly or in part, the function of the displacement or positional disagreement term in supplying a control signal to keep the driving means operating at constant velocity. Thus the system may be caused to operate at constant velocity with decreased lag or without any disagreement of the two objects, if so desired, or, by increasing the magnitude of the velocity term, to operate with the controlled object leading the controlling object.

It should be noted that the extent to which the displacement of piston 45 is not proportional to the speed of the hydraulic motor (because of any torque applied to and resisting motion of platform 18 or because of oil leakage in the pump and motor system of the Vickers transmission) in no way prevents the controlled object from following the controlling object in the manner desired. This is readily seen by noting that, should a particular operating condition call for additional displacement of piston 45, the additional displacement is supplied by an additional displacement of arm 20, initially by virtue of error between selsyns 4 and 14, but eventually by displacement of arm 19 resulting from displacement of piston 45. Thus again, a displacement of lever 19 resulting from displacement of piston 45 has taken over, wholly or in part—whichever is desired—the function of the displacement or positional disagreement term in systems of the usual type so that the system of the present invention operates at constant velocity or at rest in the presence of different load torques without disagreement of the two objects, or with the controlled object leading or lagging the controlling object by a predetermined amount, as desired.

Fig. 4 is a purely schematic simplified diagram of the system of Fig. 1 on which are designated the constants whose relationships determine the stability of the system and the error or absence of error in the following of the controlled object. Rotor 8 and stator 10 of differential 9 are shown connected by a virtual spring 9', having a stiffness $k_3$ representing the torque exerted per degree of misalignment of the stator and rotor fields. Lever 20' corresponding to lever 20 of Fig. 1 is rotated about pivot point 81 by rotation of rotor 8. The equivalent stiffness of the virtual spring 9', as manifested at the end of lever 20', may be taken as $k_3'$ where $$k_3' = \frac{k_3}{l_2}$$

If $l_2$ is assumed to have a length equal to unity, then $k_3' = k_3$. Spring 11'', having a stiffness $k_2$, represents a combination of springs 11 and 11' while $k_5$ is the stiffness of spring 72. Lever 76' pivoted to datum at 82 replaces levers 76 and 19. The distances from the connection points of springs 11'' and 72 to pivot point 82 are $l_5$ and $l_3$, respectively. The damping coefficient of the resistance to motion of piston 70 in dash-pot 71 is $f_1$. Schematically, motion of the piston 45 which directly affects speed control rod 48 is shown as being also transmitted to one end of lever 59' (corresponding to lever 59) the other end of which reciprocates sleeve 26, thus illustrating an arrangement adapted to provide a ratio between the movement of the piston and sleeve.

For purposes of analysis two ratios will now be defined:

If $l_2$ is assumed to have a length equal to unity, then $k_3' = k_3$.

$$b = \frac{\text{displacement of piston rod 48}}{\text{displacement of valve rod 23}}$$

(assuming pivot point 81 to be at the center of lever 20'), and $$d = \frac{l_3}{l_5}$$

For zero error the relationship of the system constants must be such that $$b = d + \frac{k_3'}{k_2 k_5}\left(\frac{k_2}{d} + k_5 d\right) \quad (1)$$

The derivation of this expression is as follows: If $x$ be a displacement of the pilot valve rod 23, then $bx$ is the corresponding displacement of lever 76' at distance $l_5$ from the pivot, and $dy$ will then represent the displacement of lever 76' at a distance $l_3$ from the pivot 82. The forces acting on lever 76' may be equated as follows:

$$l_3 k_5 (bx - dy) = l_5 k_2 (y - x) \quad (2)$$

Since the derivation is concerned with equilibrium conditions under constant velocity operation, the effect of the dashpot may be disregarded.

Dividing (2) by $l_3$ and separating terms in $x$ and $y$ $$x\left(k_5 b + \frac{k_2}{d}\right) = y\left(\frac{k_2}{d} + k_5 d\right) \quad (3)$$

and $$y = x\left(\frac{k_5 b + \frac{k_2}{d}}{\frac{k_2}{d} + k_5 d}\right) \quad (4)$$

The forces which act on lever 20' may be expressed as $$k_3'(\epsilon - x) = k_2(x - y) \quad (5)$$

Where $\epsilon$ = angle of misalignment of magnetic axes of synchro differential due to an error between controlled and controlling object.

Substituting (4) in (5), $$\frac{k_3' \epsilon}{x} = \left(k_3' + \frac{k_2 k_5 (d - b)}{\frac{k_2}{d} + k_5 d}\right) \quad (6)$$

If $\epsilon$ is to equal zero for all cases of constant velocity operation, then $$k_3' + \frac{k_2 k_5 (d - b)}{\frac{k_2}{d} + k_5 d} = 0 \quad (7)$$

which may be solved explicity for $b$, as in (1) above.

In order that the controlled object may follow the controlling object at a constant velocity but at an angle of lead: the value of $b$ should be greater than that for zero error as defined above and conversely for an angle of lag it should be less.

Stability in our improved system is best achieved by first making the response of that part of the system which comprises valve 24 and piston 45 so rapid that it can faithfully follow incipient oscillations in that part of the system which comprises the Selsyn instruments and the connected load, second by choosing spring constant $k_2$ so that its relation to the spring constant $k_3$, the characteristics of the hydraulic transmission, and other constants of the system, provides a stable system having rapid response and third by applying the so-called velocity signal in proper phase by adjustment of the dapming introduced by motion of piston 70. When the constants of the system fulfill the above conditions no oscillation can build up and we are free to make the system errorless for constant velocity following. Previously proposed systems have not provided this rapid response in combination with the proper phasing of a velocity control and hence could not effectively neutralize incipient oscillations and prevent their building up.

The modification of Fig. 2 illustrates a system generally similar to that shown in Fig. 1 except that dash-pot 71 is connected directly to lever 19 instead of through the spring 72 and the linkage shown in Fig. 1. This is a simplification which permits the construction of a stable system in which, while all error cannot be eliminated, the controlled object is capable of operating at a very small angle of lag which may be satisfactory for many purposes. Specifically this modification of the invention provides a system in which the lag, or error in following, which exists when arm 19 is stationary in its central position, is reduced by an amount given by the ratio $$\frac{k_2}{k_3+k_2}$$

since $k_2$ may readily be made at least four times as great as $k_3$ it follows that the lag, or error in following (at constant velocity) may be reduced by the arrangement of Fig. 2 by at least 80 per cent. As a further simplification conduit 74 may be eliminated and piston 70' corresponding to piston 70 Fig. 1, provided with a plurality of passageways 84 through which fluid is pumped from one end of the cylinder to the other. These passageways may be of desired area to give a predetermined value to the frictional constant $f_1$.

In the operation of the modification of Fig. 2, when rotor 8 exerts a torque on lever 20 due to misalignment of its field with the field of stator 10, piston 84 initially resists tilting of lever 19 and so causes springs 11 and 11' to exert a strong counter torque which is eased as piston 84 moves against friction to permit further tilting at lever 20. No velocity signal is used in this modification.

In the modification of Fig. 3, a control signal proportional primary to the velocity of the controlled object is introduced into the system electro-mechanically instead of my mechanical means only as in the arrangement of Fig. 1. In Fig. 3 piston 70' is driven from piston rod 48 through adjustable ratio lever 69 and spring 72 and its displacement is communicated to rotatable member 15' of selsyn 14 (which takes the place of previously described stator 15) by way of rack and pinion 85 and gearing 86 and 87. In this arrangement member 15', is rotated to vary the angular position of its magnetic field, the variation thus introduced causing a misalignment of the fields of "selsyns" 4 and 14 at the sending and receiving ends, respectively, and thereby a misalignment of rotor and stator fields of differential 9. An additional torque is thus exerted on levers 19 nd 20 in a manner generally similar to the additional torque exerted upon these levers by arm 78 of Fig. 1.

While the velocity term is shown as being introduced through the rotation of one of the members of selsyn 14, it will be apparent that the same effect may be produced by the rotation of one of the pair of relatively movable members of either "selsyn" 4 or differential 9, the result in any case being the misalignment of two magnetic fields of a device which directly or indirectly causes an input signal to be supplied to valve 24 with a resultant change in the output of the hydraulic motor.

Fig. 6 illustrates in the schematic form of Fig. 4 a modification of the invention in which the input to the hydraulic drive proportional to the positional disagreement of the controlling and controlled objects is supplied by a special torque motor actuated by a signal generated by the receiving end "selsyn," the signal being preferably amplified and rectified, for example, in an electron tube amplifier. "Selsyn" 4 is excited from source 6 as in the previously described arrangements but the windings of its rotor 3 are directly connected by three conductor transmission line 12' to the rotor windings of the remote "selsyn" 14 instead of to an intermediate electrical differential. The rotor 13 of "selsyn" 14 being driven in positional agreement with the controlled object, the stator 15 receives a reversible phase E. M. F. proportional in magnitude to the positional disagreement of the two objects, as is well known in the art of positional control systems, which signal is applied to the input of a balanced amplifier-rectifier 90 whose D. C. output excites torque motor 91. Amplifier 90 is preferably of a known type having a split or push-pull output circuit, such as is shown, for example, in the pending application of C. Frische et al., for Electro-hydraulic control system, Ser. No. 284,642, filed July 15, 1939.

Motor 91 comprises pole pieces 92 of a magnet assembly supplying flux to a gap in which armature 93 is located. Armature 93 carries split coil 94 (or its equivalent, two connected coils) having two external terminals and a center tap all connected to the split output circuit of amplifier 94, the two halves of the coil being respectively connected to the two halves of the output circuit. Armature 93 is mounted on shaft 95 by means of which it is capable of exerting a torque on lever 20' in the manner of rotor 8 of differential 9.

In operation, potential disagreement of the two objects creates an A. C. signal voltage in stator winding 15 proportional to the disagreement and phased according to its sign, i. e., according to whether a lag or lead in following exists. When no signal is applied to the input of amplifier 90 substantially equal rectified currents flow in the two halves of winding 94, the effects of which, due to the coil connections, neutralize one another (or the amplifier may be operated so that normally no current flows in either half of the coil). Upon the application of an input voltage to amplifier 90 a differential change of current occurs in the two halves of coil 94 and a torque is created by the interaction of the permanent field due to the pole pieces and the unbalanced armature field thus created The sense of the differential change of output and hence of the torque exerted by the rotor is determined by the phase of the amplifier input, which in turn depends on whether a lag or lead exists, and thus the torque exerted on lever 29' by rotor 93 can be made to apply an input to the hydraulic transmission of the proper sign to restore positional agreement between the two objects. By proper design, also, the torque exerted by motor 91 can be made closely proportional to the difference of the currents in the two halves of its armature winding, which in turn is readily made proportional to the signal input to amplifier 90. Other means including A. C. excited torque exerting devices may be employed to supply a torque proportional to error in following.

One of the important advantages of the arrangement of Fig. 6 over the arrangements previously described is that very little power is required as an input to amplifier 90 in comparison with the power which must be delivered to differential 9, for example, to cause it to exert the required torque on lever 20. This considerably improves the operation of the system and permits the control of a number of separate objects from a single controlling object without the behavior or position of one controlled object seriously affecting the behavior or position of any of the other objects or causing substantial reaction on the controlling object. An important application of our invention resulting from this feature is the control of a battery of guns, or other movable objects of substantial inertia, by a single controlling element, such as a sighting telescope.

In Fig. 6 there is shown a three-conductor transmission line 96 branching off from line 12'. This branch line is adapted to be connected to the rotor winding of a second "Selsyn" signal generator similar to "selsyn" 14 and if the rotor of this second "selsyn" be rotated in correspondence with a second controlled object a system similar in all respects to the one shown and described in detail, including the driving and other associated means, may be added, the controlling object and transmitter being common to the two systems. To simplify the figure only the transmission line to the receiving "selsyn" of the second system is indicated.

Since the signal taken from this receiving or controlled object "selsyn" of the second system will preferably be applied through an amplifier similar to amplifier 90 and since only a very small amount of power is transmitted over the common line to supply the inputs to the amplifiers there will be relatively little coupling between the separate systems. To further reduce interaction between the receiver "selsyn," resistances 97 and 98 may be inserted in the lines respectively feeding these "selsyns" after the point at which the lines branch from the common circuit. A considerable number of receiving "selsyns" may be interconnected in the described manner without reaction and employed as signal generators in a corresponding number of systems according to our invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A positional control system comprising a controlling object, a controlled object, a variable speed drive for actuating the controlled object, error-measuring means responsive to differences in position between controlled and controlling objects for generating an error signal as a function of said disagreement, an amplifier having its output in control of the variable speed drive and having its input connected to the error-measuring means, and a regenerative feedback connection from the amplifier output to the amplifier input, said feedback connection including means for delaying transmission to the input of the effect of changes in the output.

2. A positional control system comprising a controlling object, a controlled object, a variable speed drive for actuating the controlled object, a speed control for said drive, error-measuring means responsive to differences in position between controlled and controlling objects for generating an error signal as a function of said disagreement, an amplifier having its output connected to the speed control of the variable speed drive and having its input connected to the error-measuring means, and a regenerative feedback connection from the speed control to the amplifier input, said feedback connection including means for delaying the effect at the amplifier input of changes in the speed control.

3. A positional control system comprising a controlling object, a controlled object, a variable speed drive for actuating the controlled object, error-measuring means responsive to differences in position between controlled and controlling objects for generating an error signal as a function of said disagreement, an amplifier having its output in control of the variable speed drive, a regenerative feedback connection from the amplifier output for supplying a signal related to the speed of the controlled object, means for combining the error and the regenerative feedback signals and for supplying the combined signal to the amplifier input, and means associated with the feedback connection for delaying the effect at the amplifier input of changes in amplifier output.

4. A positional control system comprising a controlling object, a controlled object, a variable speed drive for actuating the controlled object, a movable control element in control of said drive to vary the speed thereof, error-measuring means responsive to differences in position between controlled and controlling objects for generating an error signal as a function of said positional differences, an amplifier having its input responsive to the error signal and its output connected to the movable control element of the variable speed drive, and a regenerative feedback connection between the movable speed control element and the amplifier input for supplying to said input a signal based on the position of the speed control element, said feedback connection including means for delaying transmission to the amplifier input of changes in position of the speed control.

5. A positional control system comprising a controlled object, a controlling object, a variable speed drive for actuating the controlled object, a speed control for said drive, error-measuring means responsive to differences in position between controlled and controlling objects for generating an error signal as a function of said disagreement, an amplifier having a power output member connected to the speed control for the variable speed drive and an input member connected to the error-measuring means, and a resilient regeneratively-connected feedback connection between the power output member of the amplifier and the input member, said feedback connection including means for delaying the response of the input member to changes in position of the speed control.

6. A positional control system comprising a controlled object, a controlling object, a variable speed drive for actuating the controlled object, a speed control for said drive, error-measuring means responsive to differences in position between controlled and controlling objects for generating an error signal as a function of said disagreement, an amplifier having a power output member connected to the speed control for the variable speed drive and an input member connected to the error-measuring means, and a regeneratively-connected feedback connection between the speed control member and the amplifier input, said connection including a movable member, damping means therefor, and resilient connections between the movable member and the speed control and between the movable member and the amplifier input.

7. A positional control system comprising a controlled object, a controlling object, a variable speed drive, for actuating the controlled object, a speed control for said drive, error-measuring means responsive to differences in position between controlled and controlling objects for generating an error signal as a function of said disagreement, an amplifier having displaceable input and power output devices connected respectively to the error-measuring means and to the speed control, resilient means cooperating with the error-measuring means and the amplifier input device for controlling the response of the latter to an error signal, and a regenerative feedback connection from the amplifier output to the resilient means for modifying the control action thereof on the amplifier input device in accordance with the setting of the speed control of the variable speed drive, said feedback connection including means for delaying the effect at the resilient means of changes in setting of the speed control.

8. A positional control system comprising a controlled object, a controlling object, a variable speed drive for actuating the controlled object, a speed control for said drive, error-measuring means responsive to differences in position between controlled and controlling objects for developing a force as a function of said disagreement, an amplifier having displaceable input and power output devices connected respectively to the error-measuring means and to the speed control, resilient centralizing means connected to the amplifier input device, said centralizing means being adjustable, and a regenerative feedback connection from the amplifier output for adjusting the centralizing means in accordance with the position of the speed control, said connection including a damped resilient connection between the centralizing means and the amplifier output for delaying the response of the centralizing means to changes in the setting of the speed control.

9. A positional control system comprising a controlled object, a variable speed drive for actuating the controlled object, a movable speed control element in control of said drive, error-measuring means responsive to differences in position between controlled and controlling objects for generating an error signal as a function of said positional disagreement, means including a hydraulic amplifier for actuating the movable control element of the variable speed drive, said amplifier comprising a pilot piston connected to the error-measuring means, a power piston connected to the movable element in control of the variable speed drive, a pilot piston sleeve, a repeat-back connection from the power piston to the pilot piston sleeve, and a regenerative feedback connection from the power piston for supplying a signal based on displacement of the speed control element, said feedback connection including spring and dashpot means for delaying transmission of said displacement signal, and means for combining said error and displacement signals and for actuating the pilot piston in accordance with the combined signals.

10. A positional control system comprising a controlled object, a controlling object, a variable speed drive for actuating the controlled object, a movable speed control element in control of said drive, error-measuring means responsive to differences in position between controlled and controlling objects for generating an error signal as a function of said positional disagreement, means including a hydraulic amplifier for actuating the movable control element of the variable speed drive, said amplifier comprising a pilot piston connected to the error-measuring means, a power piston connected to the movable element in control of the variable speed drive, a pilot piston sleeve, a repeat-back connection from the power piston to the pilot piston sleeve, and a regenerative feedback connection from the power piston to the pilot piston, said feedback connection including a movable member, damping means therefor, and resilient connections between the member and the power piston and between the member and the pilot piston.

GORDON S. BROWN.
JAY W. FORRESTER.